United States Patent [19]
Citta et al.

[11] Patent Number: 5,821,988
[45] Date of Patent: Oct. 13, 1998

[54] NTSC CO-CHANNEL INTERFERENCE REDUCTION SYSTEM

[75] Inventors: Richard W. Citta, Oak Park; Larry E. Nielsen, Chicago; Gary J. Sgrignoli, Mount Prospect, all of Ill.

[73] Assignee: Zenith Electronics Corporation, Glenview, Ill.

[21] Appl. No.: 575,008

[22] Filed: Dec. 19, 1995

Related U.S. Application Data

[63] Continuation-in-part of Ser. No. 520,544, Aug. 29, 1995.

[51] Int. Cl.⁶ ..................................................... H04N 5/38
[52] U.S. Cl. ............................................. 348/21; 348/470
[58] Field of Search .............................. 348/21, 470, 607, 348/608; 375/296, 346, 350; H04N 5/38

[56] References Cited

U.S. PATENT DOCUMENTS 5,602,602  2/1997  Hulyalkar ................................ 348/607

OTHER PUBLICATIONS

"VSB Transmission System", Zenith Electronics Corporation, Dec., 1993; pp. 1–27.

*Primary Examiner*—Victor R. Kostak

[57] ABSTRACT

A digital television receiver operating in the presence of an NTSC co-channel signal includes an NTSC rejection filter that is selectively inserted in the digital television signal path to minimize interference from the NTSC co-channel signal. The energy around the NTSC picture carrier is sampled. This is compared with sampled white noise energy between the NTSC picture and color carriers, after field combing the digital television signal to eliminate the effects of static signals. The comparison is used to determine whether or not the NTSC rejection filter is inserted in the digital television signal path.

31 Claims, 6 Drawing Sheets

NTSC CO-CHANNEL INTERFERENCE REDUCTION SYSTEM

CROSS REFERENCE TO RELATED APPLICATION

This application is a continuation-in-part of Ser. No. 08/520,544, filed Aug. 29, 1995.

BACKGROUND OF THE INVENTION AND PRIOR ART

This invention relates generally to high definition television (HDTV) systems and specifically to means for improving the operation of an HDTV receiver when subjected to an NTSC co-channel signal. In the Zenith Electronics Corporation developed HDTV system currently undergoing FCC evaluation, a digital multi level symbol signal is formatted in fields of repetitive, fixed length data segments, each headed by a data segment sync character, with a framing code occupying the first data segment of each field. The HDTV signal is precoded in the transmitter in anticipation of the HDTV receiver being subject to NTSC co-channel interference. An NTSC rejection filter, which has notches positioned at the locations of the co-channel NTSC picture, color and sound carriers, is selectively included in the signal path of the HDTV receiver. Incorporation of the rejection filter results in a 3 dB increase in white noise, and consequently, use of the filter is not desired unless the signal improvement due to reduction in NTSC signal interference overrides the signal impairment due to an increase in white noise.

U.S. application Ser. No. 08/474,049 describes a system for precisely offsetting the frequency of the NTSC carrier, with respect to the HDTV pilot, for maximizing the effect of the NTSC interference to allow for a more informed decision on whether to employ the NTSC rejection filter. That system imposes a requirement that the NTSC broadcaster precisely offsets its carrier with respect to the HDTV pilot. The present invention eliminates that requirement while obtaining the benefits of the NTSC rejection filter in the HDTV receiver.

OBJECTS OF THE INVENTION

A principal object of the invention is to provide a novel HDTV receiver.

A further object of the invention is to provide improved NTSC co-channel interference rejection in an HDTV receiver.

Another object of the invention is to provide a novel circuit for determining when an NTSC co-channel interference reduction filter may be advantageously incorporated in the signal path of an HDTV receiver.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
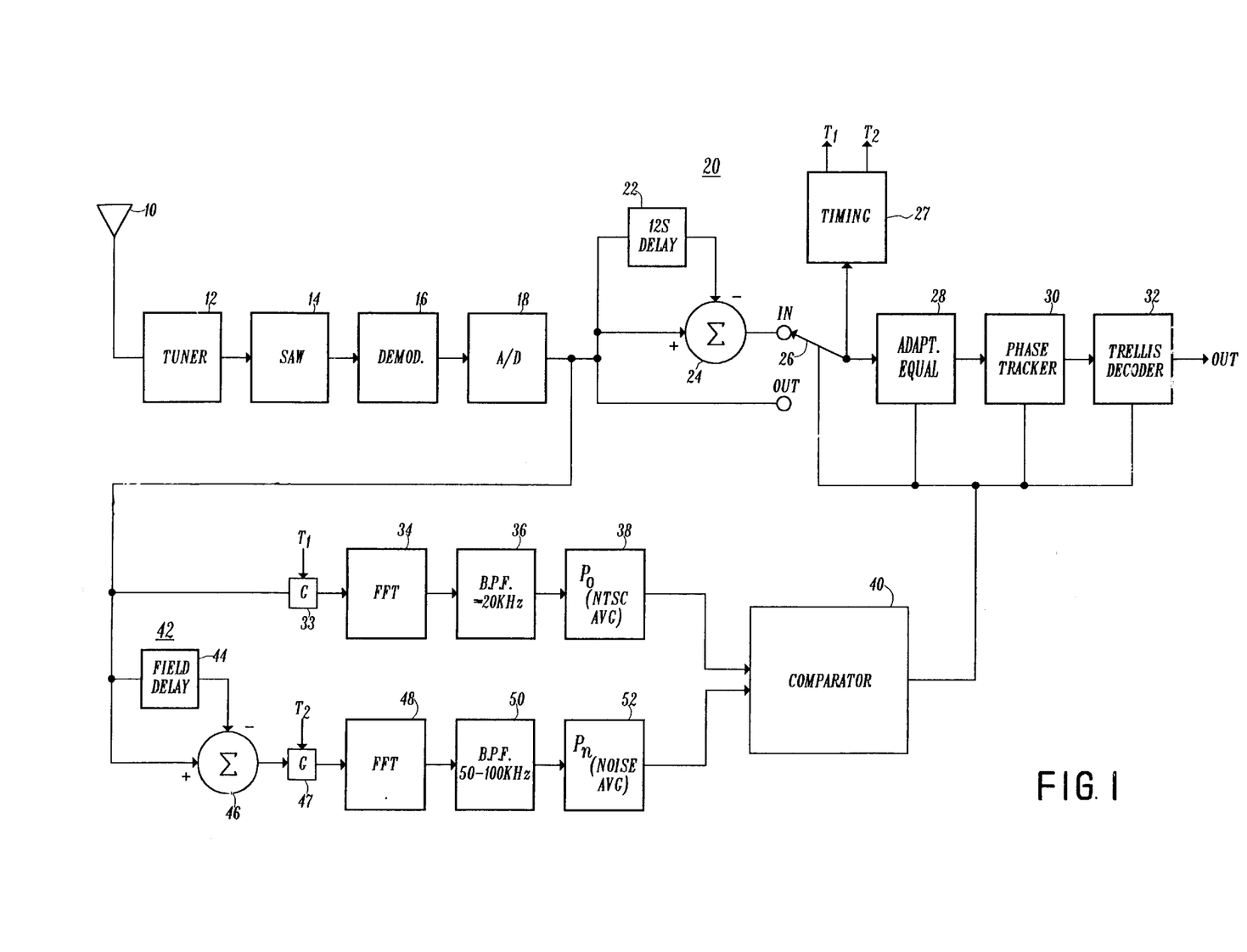
FIG. 1 is a partial block diagram of an HDTV receiver incorporating the invention.

Referring to FIG. 1, an antenna 10 is coupled to a tuner 12 for receiving an HDTV terrestrial (broadcast) signal. The output of tuner 12 is coupled to a SAW filter 14 which in turn is coupled to a demodulator 16 that develops an analog composite video signal. Demodulator 16 is coupled to an analog to digital (A/D) converter 18 where the multi level symbols of the HDTV signal are converted into multibit digital values. The output of A/D converter 18 is coupled to an NTSC rejection filter arrangement 20 that includes a bypass connection, via a switch 26 having terminals labelled In and Out. When switch 26 is in the In position, the NTSC rejection filter, which consists of a 12 symbol delay circuit 22 and an adder 24, is inserted in the HDTV signal path. When switch 26 is in its Out position, the HDTV signal from A/D converter 18 is bypassed around the NTSC rejection filter. Switch 26 supplies the coupled HDTV signal to an adaptive equalizer 28 that feeds a phase tracker 30 which, in turn, is coupled to a trellis decoder 32 for providing a decoded, equalized output signal for further processing, in a well known manner, by the remainder of the television receiver (not shown). The HDTV signal coupled by switch 26 is additionally supplied to a timing block 27 that produces timing signals T1 and T2.

The output of A/D converter 18 is also supplied to a gate 33 that is controlled by timing signal T1. Gate 33 is coupled to a fast Fourier transform (FFT) block 34 which in turn is coupled to a bandpass filter 36 that supplies a power averaging circuit 38 for assessing the average NTSC picture carrier power. The output $P_0$ of block 38 is coupled to a comparator 40. The output of A/D circuit 18 is further coupled to a field comb 42, which includes a field delay 44 and an adder 46, for substantially removing the effects of static signals, i.e. signals that don't change from one field to the next. The signal from A/D 18 is applied additively to adder 46, and through field delay 44, subtractively to adder 46. The result is that successive fields of the signal from A/D 18 are subtracted at the output of field comb 42. Therefore portions of the signal that do not change from field to field are nulled out, including fixed reference components of the received signal. The output of adder 46 is supplied to a gate 47 that is controlled by timing signal T2. Gate 47 supplies an FFT 48 which in turn is coupled to another bandpass filter 50, the output of which is coupled to a white noise power averaging circuit 52, the output ($P_N$) of which also feeds comparator 40. The output of comparator 40 controls the operation of switch 26, adaptive equalizer 28, phase tracker 30 and trellis decoder 32.

Figure 2:
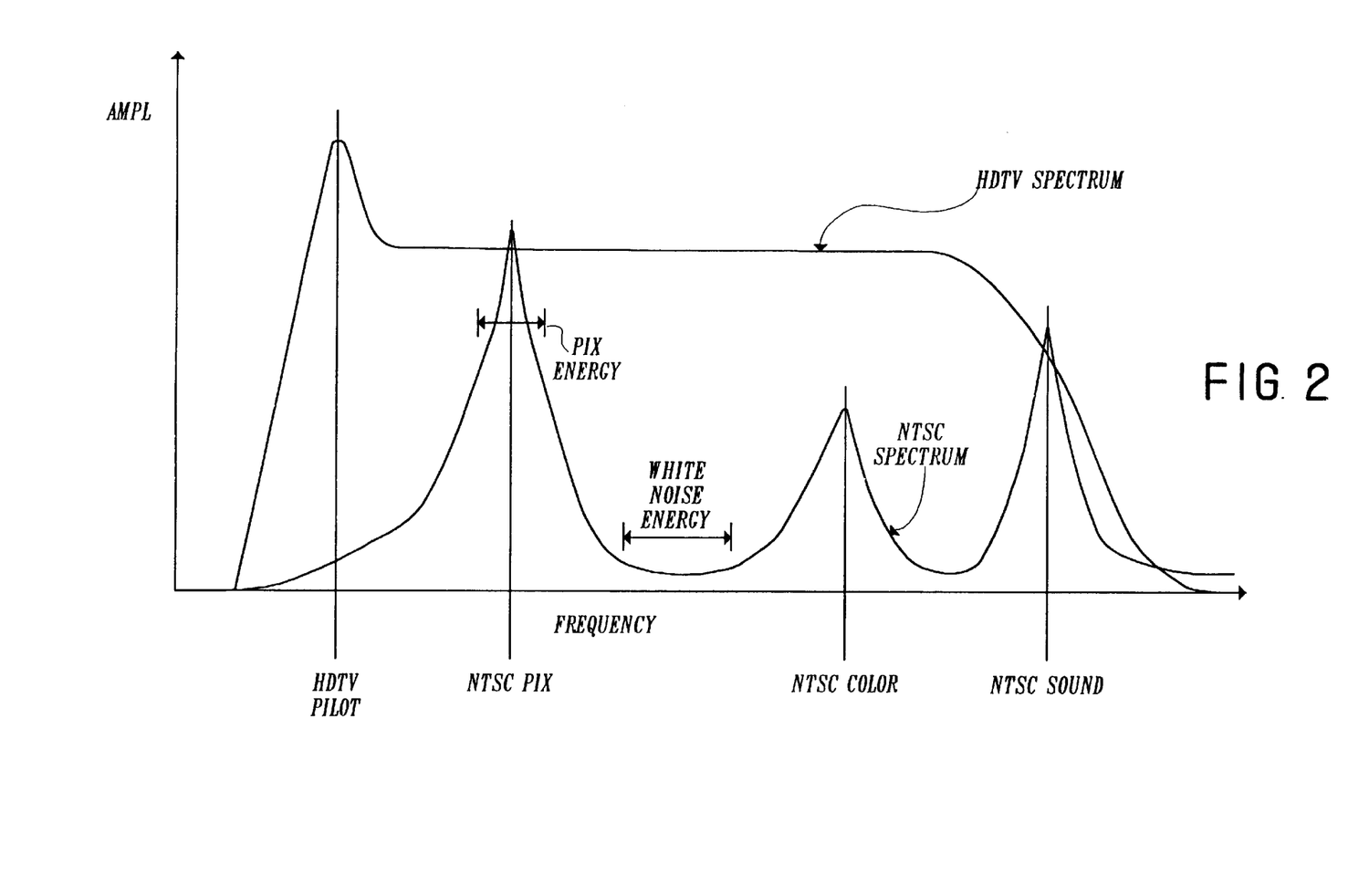
FIG. 2 is a graph indicating the spectrums of the HDTV and NTSC signals.

As is seen in FIG. 2, the HDTV energy spectrum (which is assumed to have been created by the Grand Alliance HDTV System currently undergoing testing by the FCC) has a peak at the HDTV pilot (about 310 KHz above the lower edge of the 6 MHz television channel frequency) and is thereafter substantially flat. The NTSC energy spectrum has a high peak at the picture frequency, a low peak at the NTSC color frequency and an intermediate peak at the NTSC sound frequency. The frequency range (about 20 KHz) around the NTSC picture carrier is indicated as is the energy in a frequency range of about 50–100 KHz between the NTSC picture and color carriers. This range is indicated as white noise energy.

The system of the invention compares the energy corresponding to the NTSC picture carrier with the white noise energy, as represented by the area between the NTSC picture and color carriers, by subtracting the average developed powers therein to determine whether or not the NTSC rejection filter 20 of FIG. 1 should be inserted in the HDTV signal path.

Since the received digital data is in the time domain, it is converted to the frequency domain to enable the energy comparisons to be made in the desired frequency ranges. This is accomplished by the fast Fourier transform circuits 34 and 48, which develop the frequency spectrums of the symbols. The bandpass filter 36 (about 20 KHz) and bandpass filter 50 (about 50–100 KHz) select the frequency ranges of interest. The energies in these respective frequency ranges are averaged to obtain the average NTSC power $P_0$ and the average white noise power $P_N$. The comparator 40 is empirically arranged to signal for the insertion of the NTSC rejection filter 20 into the HDTV signal path when the average NTSC picture energy exceeds the average white noise energy by a predetermined amount. In general, if the NTSC power to white noise ratio is large, the rejection filter should be included in the HDTV signal path whereas if the NTSC power to white nose ratio is small, the NTSC rejection filter should be omitted.

Figure 3:
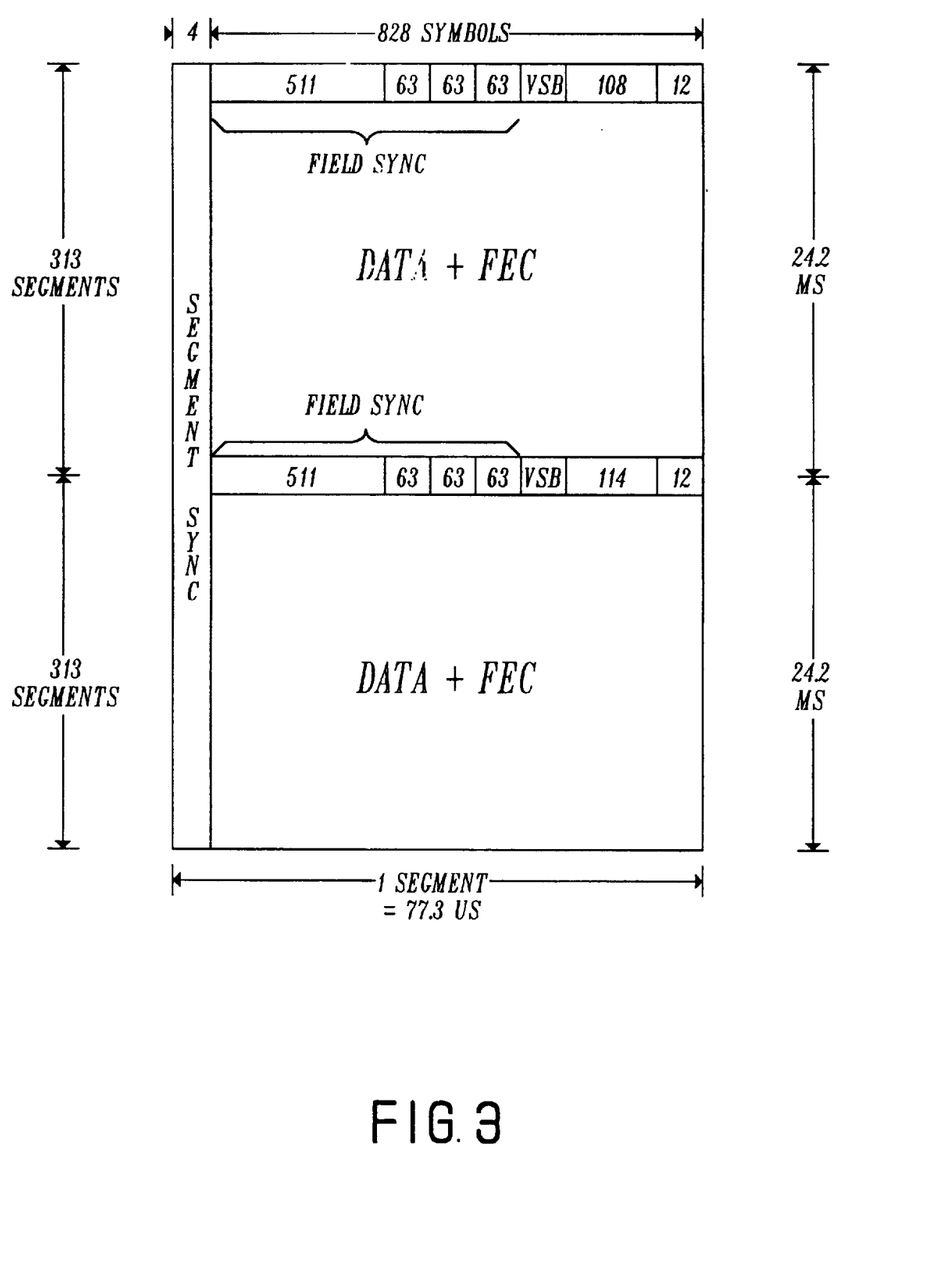
FIG. 3 is a chart showing the format of an HDTV frame.

The HDTV signal preferably has the frame format illustrated in FIG. 3. Each frame comprises two fields with each field including 313 segments of 832 multilevel symbols. The first segment of each field is referred to as a field segment and the remaining 312 segments are data segments. Each data segment comprises a four symbol segment sync character followed by 828 data symbols. Each field segment comprises the four symbol segment sync character followed by a field sync component comprising a predetermined 511 symbol PN sequence and three predetermined 63 symbol PN sequences (the middle one of which is inverted in successive fields). A VSB mode control signal (defining the symbol constellation size) follows the last 63 PN sequence, which is in turn followed by 108 reserved symbols and 12 symbols copied from the previous field.

Referring back to FIG. 1, in operation, gates 33 and 47 are controlled by timing signals T1 and T2, respectively, to pass fixed numbers of the digital symbols to their respective fast Fourier transform circuits. In the preferred embodiment, 2,048 samples (beginning with field sync and extending into data) are passed through gate 33 to FFT 34 by virtue of timing signal T1. The FFT outputs a number of coefficients (depending upon the size of the FFT). In the disclosed embodiment, FFT 34 outputs 2,048 coefficients to BPF 36. The output from BPF 36 may be from 3–5 coefficients, representing an approximate 20 KHz bandwidth around the NTSC picture carrier.

The last half of the 511 symbol PN sequence of field sync is sampled and used to determine the white noise energy. Sampling the last half (256 symbols) of the 511 symbol PN sequence is done to avoid intersymbol interference which could be caused by the random data preceding field sync. Field combing these symbols cancels any repetitive values, including the 256 symbols themselves and any other static interference. Timing signal T2 operates gate 47 to pass the field combed 256 symbols to FFT 48. The signal is "zero padded", i.e. the remaining 1792 (2,048–256) points are supplied as zeroes to fill out the 2,048 point sequence. FFT 48 also outputs 2048 coefficients and the output from BPF 50 is about 125 coefficients. Each coefficient has a real part R and an imaginary part I. The average noise power is determined by taking a summation of the squares of the real and imaginary parts ($R^2+I^2$) of the coefficients divided by the number of coefficients for each of the coefficients (3–5 in the case of the NTSC picture carrier and 125 in the case of the noise). The average power corresponding to the NTSC picture carrier is designated $P_0$ and the average white noise power is designated $P_N$.

Figure 4:
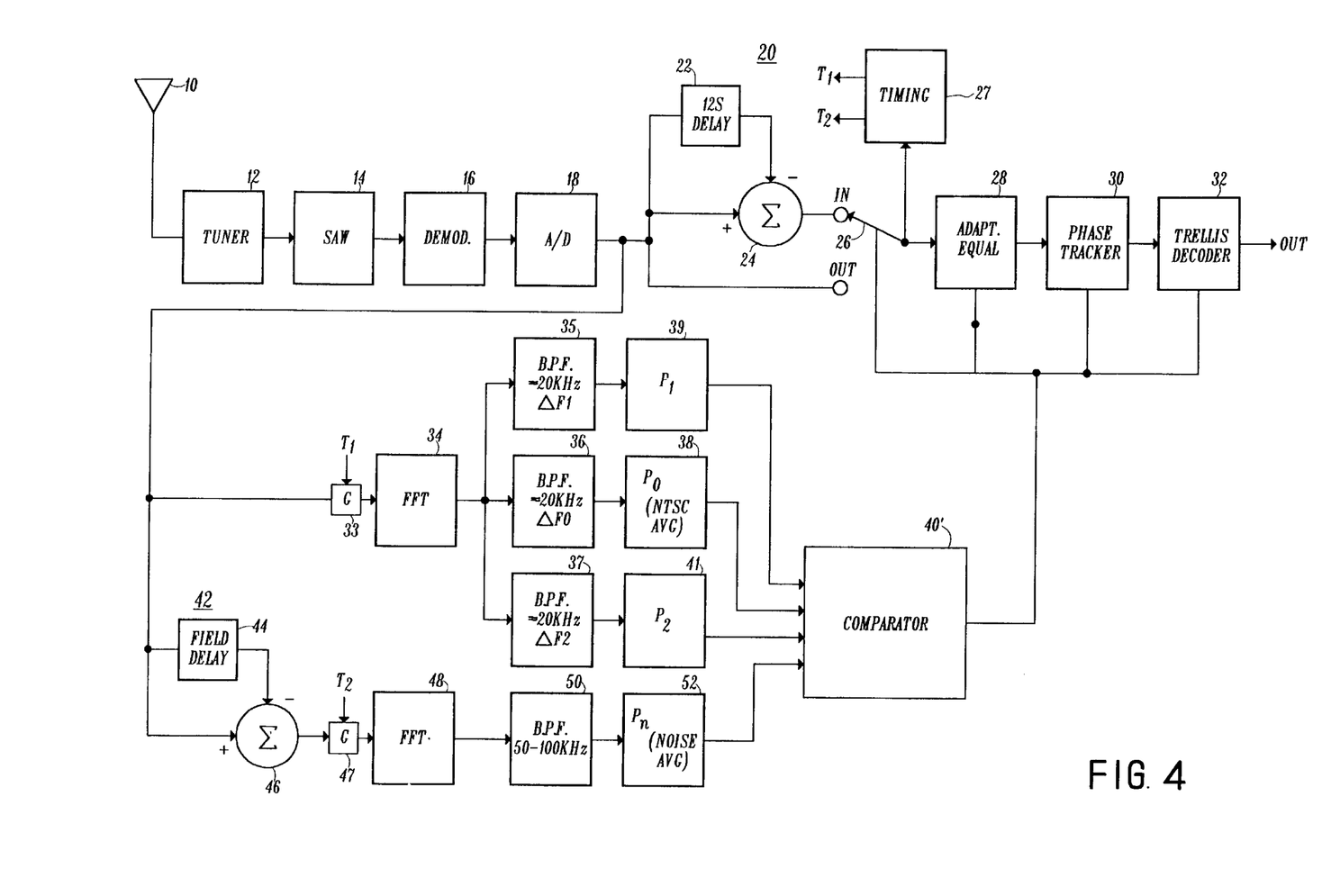
FIG. 4 is a partial block diagram of a presently preferred implementation of the invention.
Figure 5:
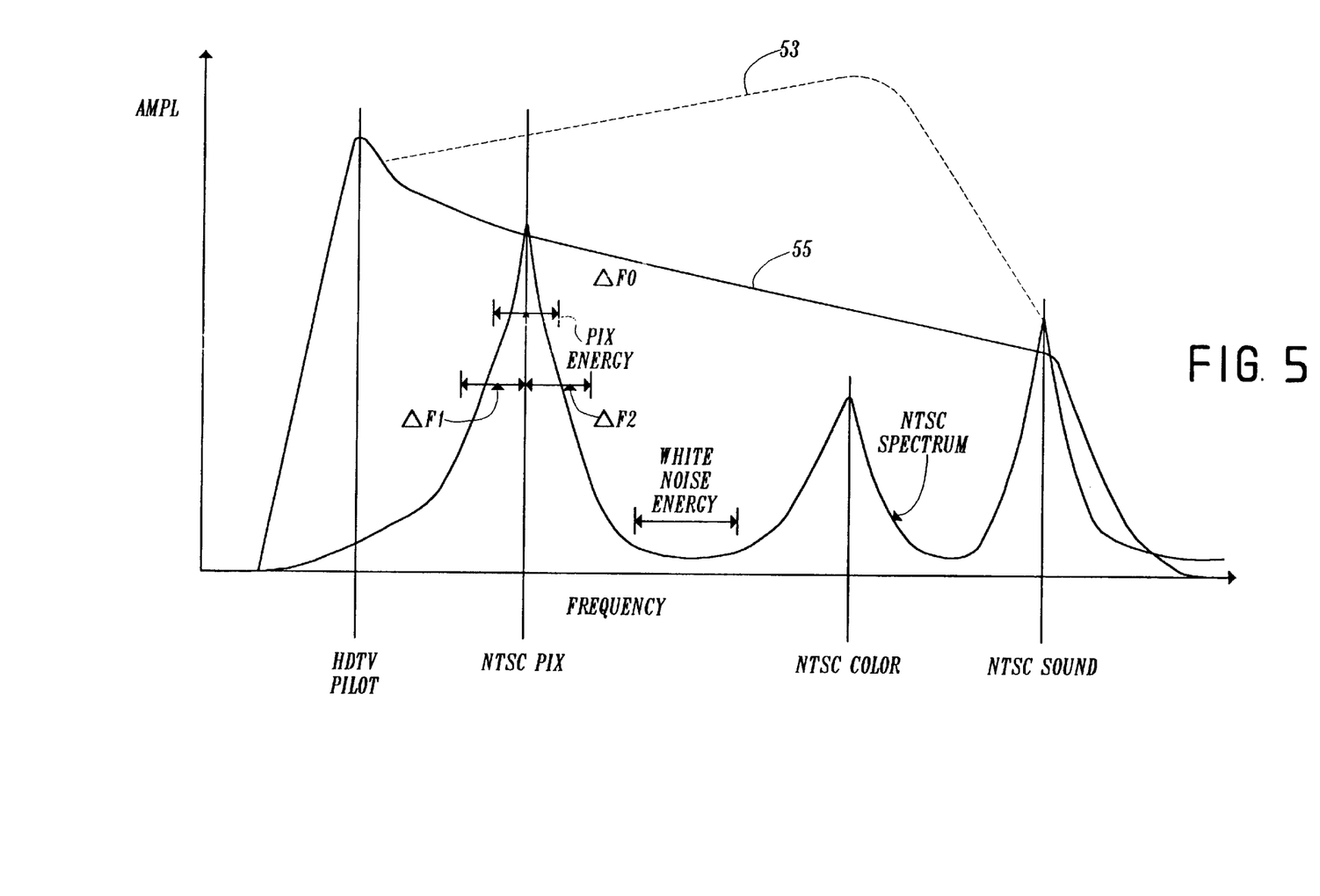
FIG. 5 is a graph illustrating the NTSC spectrum and distorted HDTV spectra due to short duration ghosts.

The presently preferred embodiment of the invention is shown in FIGS. 4 and 5. In certain situations, very short ghosts, e.g. those of less than one symbol interval may result in tilting (aberration) of the ATV spectrum in either direction as illustrated by the dashed and solid lines 53 and 55 in FIG. 5. Sampling of the energy in the small frequency range ΔFO may result in the spectrum tilt being erroneously interpreted as NTSC picture carrier energy in establishing the operation of the NTSC rejection comb filter.

This difficulty is avoided by examining the power of the received signals in respective 20 KHz bands on either side of the NTSC picture carrier. (The examination of only one such frequency band will also suffice to determine whether it is NTSC picture carrier energy that is being identified.) If the energy in the examined band (or bands) is comparable to, i.e. nearly equal to, the energy in the NTSC picture carrier frequency band that is examined, it is assumed that the energy is due to a spectrum aberration and not to an NTSC picture carrier. Thus, if the calculated power $P_1$ or $P_2$ is approximately equal to the calculated power $P_0$, the NTSC rejection comb is bypassed without further examination. If it is determined to be NTSC picture carrier energy, the process described above for FIG. 1 is carried out.

The circuit arrangement is shown in FIG. 4, which is identical to FIG. 1 up to the fast Fourier transform circuits 34 and 38. The noise processing section is the same with BPF 50 supplying noise power averaging circuit 52 to develop $P_N$, which is representative of white noise. The NTSC power processing section has additional BPF's 35 and 37 coupled to receive the output of fast Fourier transform block 34. Average power calculating circuits 39 and 41 for generating signals $P_1$ and $P_2$, are coupled to BPF's 35 and 37, respectively.

As mentioned above, BPF's 35 and 37 select frequency ranges of about 20 KHz closely adjacent to both sides of the NTSC picture carrier frequency. It will be recalled that BPF 36 selects a frequency range of 20 KHz around the NTSC picture carrier, i.e. ±10 KHz about the NTSC picture carrier. Thus BPF's 35 and 37 extend farther on either side of the NTSC picture carrier.

All of the calculated average powers $P_0$, $P_1$, $P_2$ and $P_N$ are supplied to comparator 40' which executes an algorithm to determine whether the NTSC rejection filter should be inserted in the signal path or not. The criteria are:

1. If $P_1$ (or $P_2$) is approximately equal to $P_0$, the comb filter is out (bypassed).
2. If not 1, and if $P_0$ is greater than a defined upper limit (UL), the comb filter is put in.
3. If not 2, and if a defined lower limit (LL) is greater than $P_0$, the comb is out.
4. If not 3, if $P_0$ less $P_N$ is greater than a threshold T, the comb is put in;
   if $P_0$ less $P_N$ is not greater than T, the comb is out.

Figure 6:
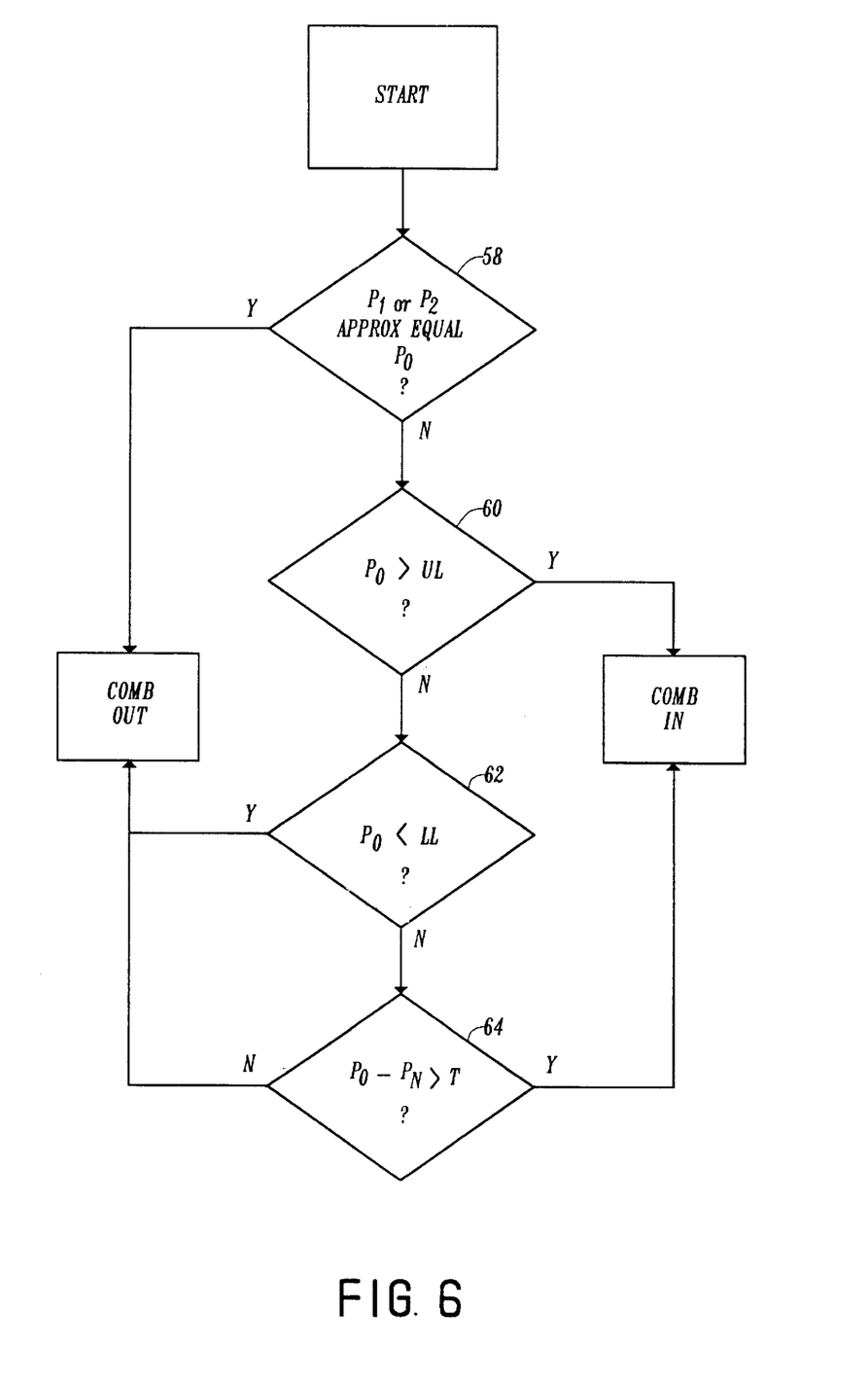
FIG. 6 is a flow chart illustrating the decision making process for using the NTSC interference rejection filter.

The algorithm is executed as indicated in the flow chart of FIG. 6 where decision block 58 corresponds to 1 above, decision block 60 corresponds to 2 above, decision block 62 corresponds to 3 above and decision block 64 corresponds to 4 above.

For the implementation of FIG. 1 (without the sampling closely adjacent to the NTSC picture carrier), step 58 is omitted in the algorithm and in the flow chart. The remainder of the operation proceeds as described. It will be appreciated that both arrangements are included within the invention, the one described in FIGS. 4, 5 and 6 being a presently preferred implementation.

What has been described is a novel arrangement for determining when to insert an NTSC rejection filter in the signal path of an HDTV receiver. It is recognized that numerous changes in the described embodiment of the invention will be apparent to those skilled in the art without departing from its true spirit and scope. The invention is to be limited only as defined in the claims.

What is claimed is:

1. A method of operating a digital television system in the presence of an NTSC co-channel signal comprising:

sampling energy in the vicinity of the NTSC picture carrier;

sampling energy between carriers of the NTSC signal;

comparing the sampled energies; and inserting an NTSC rejection filter in the signal path of the digital television signal based upon the comparison.

2. The method of claim 1 wherein energy around the NTSC picture carrier is sampled and white noise energy between the NTSC picture and color carriers is sampled.

3. The method of claim 1 wherein the digital television signal is formatted in successive fields and further including field combing the digital television signal to eliminate the effects of static signals in the sampled white noise energy.

4. The method of claim 1 wherein the first sampling step comprises sampling a small frequency range of signal around the NTSC picture carrier:

field combing the digital television signal to eliminate the effects of static signals; and wherein the second sampling step comprises sampling the field combed signal in a frequency range between the NTSC picture and color carriers.

5. The method of claim 3 wherein the field combing step comprises field combing a first invariant portion of the digital television signal which is preceded and followed by respective second and third invariant portions of the digital television signal.

6. The method of claim 1 further comprising sampling the energies by performing respective fast Fourier transformations and bandpass filtering the results thereof.

7. The method of claim 1 wherein the digital television signal is formatted in successive fields each including a fixed field sync, having a fixed pseudo random number sequence, followed by data and wherein the first sampling step comprises performing a fast Fourier transformation of a plurality of samples during the field sync and a portion of the data immediately following the field sync and bandpass filtering the transformed signal over a range of about 20 KHz around the NTSC carrier and wherein the second sampling step comprises field combing the digital television signal, performing a fast Fourier transformation of the field combed samples during a central portion of the field sync and bandpass filtering the transformed signal over a range of about 50–100 KHz between the NTSC picture and color carriers.

8. A digital television receiver operating in the presence of an NTSC co-channel signal comprising:

means for sampling energy in the vicinity of the picture carrier of said NTSC signal;

means for sampling energy in a white noise area between carriers of said NTSC signal;

means for comparing said sampled energies;

an NTSC rejection filter; and means for inserting said NTSC rejection filter in the signal path of said digital television receiver based upon said comparison.

9. The receiver of claim 8 wherein said energy in the vicinity of said picture carrier is energy on either side of said NTSC picture carrier and wherein said white noise area is between said NTSC picture carrier and the NTSC color carrier.

10. The receiver of claim 8 wherein the digital television signal is formatted in successive fields and further comprising:

field combing means for eliminating the effects of static signals in said sampled white noise area.

11. The receiver of claim 8 wherein energy on either side of said NTSC picture carrier is sampled and wherein said white noise energy is sampled between said NTSC picture carrier and the NTSC color carrier and further including:

field combing the digital television signal to eliminate the effects of static signals in said sampled white noise area.

12. The receiver of claim 8 further comprising:

respective fast Fourier transform means and bandpass filter means coupled to said energy sampling means for developing said sampled energies.

13. The receiver of claim 12 wherein said digital television signal is formatted in successive fields each including a field sync having a fixed pseudo random number sequence, followed by data; and timing means for controlling said energy sampling means to;

sample said NTSC picture carrier during said field sync and a portion of said data; and sample said white noise energy during a central part of said pseudo random number sequence.

14. The receiver of claim 13 including means for field combing said digital television signal coupled to the input of said white noise energy sampling means.

15. The receiver of claim 12 further including:

comparator means for accepting said energy samples and controlling said rejection filter when the energy corresponding to said NTSC picture carrier exceeds said white noise energy by a predetermined amount.

16. A digital television receiver operating in the presence of an NTSC co-channel signal comprising:

first sampling means for sampling energy in the vicinity of the picture carrier of said NTSC signal;

field combing means;

second sampling means coupled to said field combing means for sampling energy in a white noise area between carriers of said NTSC signal, said field combing means eliminating the effects of static signals in said sampled white noise area;

first and second fast Fourier transform means coupled to said first and said second sampling means, respectively;

first and second bandpass filter means coupled to said first and said second fast Fourier transform means, respectively;

first and second power calculating means coupled to said first and said second bandpass filter means, respectively, for calculating the power in the vicinity of said NTSC picture carrier and the power in said white noise area, respectively;

an NTSC rejection filter; and comparison means for inserting said NTSC rejection filter in the signal path of said digital television receiver based upon said calculated powers.

17. A method of operating a digital television system in the presence of an NTSC co-channel signal comprising:
   sampling energy in an area including the NTSC picture carrier and energy closely adjacent to one side of the NTSC picture carrier;
   sampling energy between carriers of the NTSC signal;
   comparing the sampled energies; and
   inserting an NTSC rejection filter in the signal path of the digital television signal based upon the comparison.

18. The method of claim 17 wherein white noise energy between the NTSC picture and color carriers is sampled and wherein the first sampling step comprises sampling a small frequency range of signal around the NTSC picture carrier and sampling another small frequency range on one side of the NTSC picture carrier;
   field combing the digital television signal to eliminate the effects of static signals; and
   wherein the second sampling step comprises sampling the field combed signal in a frequency range between the NTSC picture and color carriers.

19. The method of claim 17 wherein the digital television signal is formatted in successive fields and further including field combing the digital television signal to eliminate the effects of static signals in the sampled white noise energy.

20. The method of claim 19 wherein the field combing step comprises field combing a first invariant portion of the digital television signal which is preceded and followed by respective second and third invariant portions of the digital television signal.

21. The method of claim 17 further comprising sampling the energies by performing respective fast Fourier transformations and bandpass filtering the results thereof.

22. The method of claim 17 wherein the digital television signal is formatted in successive fields each including a fixed field sync, having a fixed pseudo random number sequence, followed by data and wherein the first sampling step comprises performing a fast Fourier transformation of a plurality of samples during the field sync and a portion of the data immediately following the field sync and bandpass filtering the transformed signal over respective ranges of about 20 KHz around the NTSC carrier and about 20 KHz on one side of the NTSC carrier and wherein the second sampling step comprises field combing the digital television signal, performing a fast Fourier transformation of the field combed samples during a central portion of the field sync and bandpass filtering the transformed signal over a-range of about 50–100 KHz between the NTSC picture and color carriers.

23. A digital television receiver operating in the presence of an NTSC co-channel signal comprising:
   means for sampling energy in an area including the picture carrier of said NTSC signal and closely adjacent to one side of said NTSC picture carrier;
   means for sampling energy in a white noise area between carriers of said NTSC signal;
   means for comparing said sampled energies;
   an NTSC rejection filter; and
   means for inserting said NTSC rejection filter in the signal path of said digital television receiver based upon said comparison.

24. The receiver of claim 23 wherein said white noise energy is sampled between said NTSC picture carrier and the NTSC color carrier and further including:
   field combing the digital television signal to eliminate the effects of static signals in said sampled white noise area.

25. The receiver of claim 23 further comprising:
   respective fast Fourier transform means and bandpass filter means coupled to said energy sampling means for developing said sampled energies.

26. The receiver of claim 25 wherein said digital television signal is formatted in successive fields each including a field sync having a fixed pseudo random number sequence, followed by data; and
   timing means for controlling said energy sampling means to;
   sample said NTSC picture carrier during said field sync and a portion of said data; and
   sample said white noise energy during a central part of said pseudo random number sequence.

27. The receiver of claim 26 including means for field combing said digital television signal coupled to the input of said white noise energy sampling means.

28. The receiver of claim 25 further including:
   comparator means for accepting said energy samples and controlling said rejection filter when the energy corresponding to said NTSC picture carrier exceeds said white noise energy by a predetermined amount.

29. A digital television receiver operating in the presence of an NTSC co-channel signal comprising:
   first sampling means for sampling energy in small frequency ranges around the picture carrier of said NTSC signal and closely adjacent to one side of the picture carrier of said NTSC signal;
   field combing means;
   second sampling means coupled to said field combing means for sampling energy in a white noise area between carriers of said NTSC signal, said field combing means eliminating the effects of static signals in said sampled white noise area;
   first and second fast Fourier transform means coupled to said first and said second sampling means, respectively;
   first and second bandpass filter means coupled to said first fast Fourier transform means;
   third bandpass filter means coupled to said second fast Fourier transform means;
   first and second power calculating means coupled to said first and said second bandpass filter means for calculating the powers in small frequency ranges around and closely adjacent to one side of said NTSC picture carrier;
   third power calculating means coupled to said third bandpass filter for calculating the power in said white noise area;
   an NTSC rejection filter; and
   comparison means for inserting said NTSC rejection filter in the signal path of said digital television receiver based upon said calculated powers.

30. A digital television receiver operating in the presence of an NTSC co-channel signal comprising:
   first sampling means for sampling energy a) in a small frequency range around the picture carrier of said NTSC signal, b) in a small frequency range closely adjacent to one side of said picture carrier and c) in a small frequency range closely adjacent to the other side of said picture carrier;
   field combing means;
   second sampling means coupled to said field combing means for sampling energy in a white noise area between carriers of said NTSC signal, said field combing means eliminating the effects of static signals in said sampled white noise area;

first and second fast Fourier transform means coupled to said first and said second sampling means, respectively;

first, second and third bandpass filter means coupled to said first fast Fourier transform means;

fourth bandpass filter means coupled to said second fast Fourier transform means;

first, second and third power calculating means coupled to said first, second and third bandpass filter means, respectively, for calculating the powers in said small frequency ranges, respectively;

fourth power calculating means coupled to said fourth bandpass filter means for calculating the power in said white noise area;

an NTSC rejection filter; and comparison means for inserting said NTSC rejection filter in the signal path of said digital television receiver based upon said calculated powers.

31. The television receiver of claim 30 wherein all of said small frequency ranges are about 20 KHz wide.

* * * * *